(12) United States Patent
Tandon et al.

(10) Patent No.: US 11,816,080 B2
(45) Date of Patent: Nov. 14, 2023

(54) SEVERITY COMPUTATION OF ANOMALIES IN INFORMATION TECHNOLOGY OPERATIONS

(71) Applicant: International Business Machines Corporation, Armonk, NY (US)

(72) Inventors: Akhil Tandon, San Jose, CA (US); Pooja Aggarwal, Bengaluru (IN); Seema Nagar, Bangalore (IN); Hau-Wen Chang, San Jose, CA (US); Xiaotong Liu, San Jose, CA (US); Anbang Xu, San Jose, CA (US); Harshit Kumar, Delhi (IN)

(73) Assignee: International Business Machines Corporation, Armonk, NY (US)

( * ) Notice: Subject to any disclaimer, the term of this patent is extended or adjusted under 35 U.S.C. 154(b) by 231 days.

(21) Appl. No.: 17/361,504

(22) Filed: Jun. 29, 2021

(65) Prior Publication Data
US 2022/0414072 A1 Dec. 29, 2022

(51) Int. Cl.
G06F 16/215 (2019.01)
G06F 16/901 (2019.01)
G06N 20/00 (2019.01)

(52) U.S. Cl.
CPC ........ G06F 16/215 (2019.01); G06F 16/9024 (2019.01); *G06N 20/00* (2019.01)

(58) Field of Classification Search
None
See application file for complete search history.

(56) References Cited

U.S. PATENT DOCUMENTS 7,363,656 B2 4/2008 Weber
8,098,585 B2 1/2012 Jiang
(Continued)

FOREIGN PATENT DOCUMENTS

CN 105956665 B 9/2016
WO 2011123104 A1 10/2011
(Continued)

OTHER PUBLICATIONS

Daintith, John; and Wright, Edmund. "machine learning." A Dictionary of Computing (6 ed.). Oxford University Press. 2008. (Year: 2008).*

(Continued)

*Primary Examiner* — Alex Gofman
*Assistant Examiner* — Umar Mian
(74) *Attorney, Agent, or Firm* — Andre Adkins

(57) ABSTRACT

Embodiments of the present invention provide a computer system, a computer program product, and a method that comprises identifying a plurality of data logs; generating a data model using analyzed time series data from the identified data logs; detecting anomalies within the generated data model; constructing a causal graph using the detected anomalies and retrieved domain knowledge; computing a severity value for the detected anomalies with the constructed causal graph; assigning the detected anomaly to a classification based on a function vector, wherein the computed severity value is a function vector; and automatically modifying a function of a computing device based on the function vector of the assigned, detected anomaly, wherein a modification addresses the detected anomaly located at a center of the constructed casual graph.

17 Claims, 4 Drawing Sheets

(56) References Cited

U.S. PATENT DOCUMENTS

| | | | |
|---|---|---|---|
| 8,688,620 | B2 | 4/2014 | Krishnamurthy |
| 8,868,474 | B2 | 10/2014 | Leung |
| 9,632,858 | B2 | 4/2017 | Sasturkar |
| 10,289,471 | B2 | 5/2019 | Cheng |
| 10,909,241 | B2 | 2/2021 | Puri |
| 2012/0136909 | A1 | 5/2012 | Wang |
| 2014/0244572 | A1* | 8/2014 | Hill ................. G06F 16/958 707/603 |
| 2014/0372347 | A1 | 12/2014 | Cohen |
| 2016/0148103 | A1* | 5/2016 | Sarrafzadeh ........ G06N 20/00 706/46 |
| 2016/0342453 | A1* | 11/2016 | Khan ................ G06F 11/0793 |
| 2017/0063905 | A1 | 3/2017 | Muddu |
| 2017/0235626 | A1* | 8/2017 | Zhang ............... G06F 11/3452 714/26 |
| 2018/0307994 | A1 | 10/2018 | Cheng |
| 2018/0316707 | A1 | 11/2018 | Dodson |
| 2018/0322283 | A1* | 11/2018 | Puri ................... G06F 16/254 |
| 2018/0336349 | A1 | 11/2018 | Zhang |
| 2019/0227860 | A1* | 7/2019 | Gefen ................ G06F 16/9024 |
| 2020/0084087 | A1* | 3/2020 | Sharma ................ H04W 24/04 |
| 2020/0202184 | A1* | 6/2020 | Shrestha ............ G06F 16/9024 |
| 2020/0267057 | A1 | 8/2020 | Garvey |
| 2021/0165704 | A1* | 6/2021 | Savir .................. G06F 11/079 |

FOREIGN PATENT DOCUMENTS

| | | |
|---|---|---|
| WO | WO-2019199457 A1 * | 10/2019 |
| WO | WO-2022076234 A1 * | 4/2022 |

OTHER PUBLICATIONS

Duncan et al., "Cloud Computing 2019 Proceedings of the Tenth International Conference on Cloud Computing, GRIDs, and Virtualization", May 2019, 149 pages, <https://www.researchgate.net/publication/333024381>.

Pandeeswari et al., "Anomaly Detection System in Cloud Environment Using Fuzzy Clustering Based ANN", Published online: Aug. 16, 2015, DOI 10.1007/s11036-015-0644-x, 12 pages.

Schmidt et al., "Anomaly Detection in Cloud Computing Environments", Downloaded Apr. 15, 2021, 135 pages.

Muralidharan, et al., "Monitoring and Managing IoT Applications in Smart Cities Using Kubernetes", May 2019, 149 pps., <https://www.researchgate.net/profile/Bob-Duncan/publication/333024381_CLOUD_COMPUTING_2019_Proceedings_of_the_Tenth_International_Conference_on_Clou d_Computing_GRIDs_and_Virtualization/links/5cd74276a6fdccc9dda36ae0/CLOUD-COMPUTING-2019-Proceedings- of-the-Tenth-International-Conference-on-Cloud-Computing-GRIDs-and-Virtualization.pdf#page=121>.

* cited by examiner

SEVERITY COMPUTATION OF ANOMALIES IN INFORMATION TECHNOLOGY OPERATIONS

BACKGROUND

The present invention relates generally to the field of data analysis technology, and more specifically continuous anomaly detection technology.

Data analysis is the process of inspecting, cleansing, transforming, and modeling data with the goal of discovering useful information, informing conclusions, and supporting decision-making. Data analysis has multiple facets and approaches, encompassing diverse techniques under a variety of names, and is used in different business, science, and social science domains. In today's world, data analysis plays a role in making decisions more scientific and helping operate more effectively. Data mining is a particular data analysis technique that focuses on statistical modeling and knowledge discovery for predictive rather than purely descriptive purposes, while data intelligence covers data analysis that relies heavily on aggregation, focusing mainly on data information. In statistical applications, data analysis can be divided into descriptive statistics, exploratory data analysis, and confirmatory data analysis. Exploratory data analysis focuses on discovering new features in data while confirmatory data analysis focuses on confirming or falsifying existing hypotheses. Predictive analysis focuses on the application of statistical models for predictive forecasting or classification, while text analysis applies statistical, linguistic, and structural techniques to extract and classify information from textual sources, a species of unstructured data.

SUMMARY

Embodiments of the present invention provide a computer system, a computer program product, and a method that comprises identifying a plurality of data logs; generating a data model using analyzed time series data from the identified data logs; detecting anomalies within the generated data model; constructing a causal graph using the detected anomalies and retrieved domain knowledge; computing a severity value for the detected anomalies with the constructed causal graph; assigning the detected anomaly to a classification based on a function vector, wherein the computed severity value is a function vector; and automatically modifying a function of a computing device based on the function vector of the assigned, detected anomaly, wherein a modification addresses the detected anomaly located at a center of the constructed casual graph.

BRIEF DESCRIPTIONS OF THE DRAWINGS

DETAILED DESCRIPTION

Embodiments of the present invention improve current data analysis technology by dynamically computing severity of anomalies and evolving grouping of computed anomalies using causal graph algorithms. Current data analysis technologies require deploying monitoring tools that continuously monitor the function of computer systems, which detect anomalies using data logs continuously generated over time. Generally, current data analysis technologies detect every anomaly even though each anomaly is not equally impactful to the function of the computer system. Embodiments of the present invention compute a severity of each anomaly based on the spread of anomaly to other functions of the computing system and a calculated impact using casual relationships graphs inferred from multivariate time series modeling of data logs. Embodiments of the present invention group detected anomalies based on predetermined classifications, and when a new anomaly is detected, embodiments of the present invention assign the newly detected anomaly to an existing classification. In other embodiments, the present invention generates a new classification for the newly detected anomaly in response to the newly detected anomaly failing to contain a predetermined threshold of similarity with the pre-existing classifications. Embodiments of the present invention improve current data analysis technology by computing severity of a plurality of anomalies simultaneously, which allows for investigation of detected anomalies to occur holistically using the classifications of detected anomalies. Embodiments of the present invention compute a severity value for a plurality of detected anomalies by identifying a plurality of data logs; generating a data model using analyzed time series data from the identified data logs; detecting anomalies within the generated data model; constructing a causal graph using the detected anomalies and retrieved domain knowledge; computing a severity value for the detected anomalies with the constructed causal graph; and assigning the detected anomaly to a classification based on the computed severity value associated with the detected anomaly.

Figure 1:
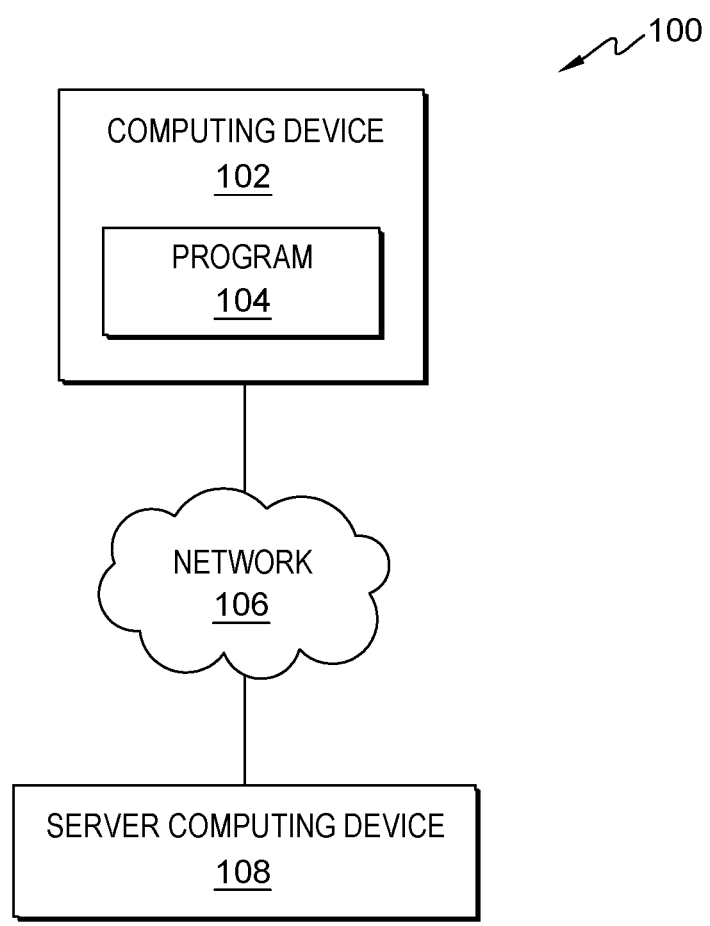
FIG. 1 is a functional block diagram depicting an environment with a computing device connected to or in communication with another computing device, in accordance with at least one embodiment of the present invention.

FIG. 1 is a functional block diagram of a computing environment 100 in accordance with an embodiment of the present invention. The computing environment 100 includes a computing device 102 and a server computing device 108. The computing device 102 and the server computing device 108 may be desktop computers, laptop computers, specialized computer servers, smart phones, wearable technology, or any other computing devices known in the art. In certain embodiments, the computing device 102 and the server computing device 108 may represent computing devices utilizing multiple computers or components to act as a single pool of seamless resources when accessed through a network 106. Generally, the computing device 102 and the server computing device 108 may be representative of any electronic devices, or a combination of electronic devices, capable of executing machine-readable program instructions, as described in greater detail with regard to FIG. 4.

The computing device 102 may include a program 104. The program 104 may be a stand-alone program 104 on the computing device. In another embodiment, the program 104 may be stored on a server computing device 108. In this embodiment, the program 104 improves current data analysis technology by computing a severity score for each detected anomaly within a constructed casual graph based on a plurality of data logs. In this embodiment, the program 104 improves current data analysis technology by decreasing an amount of resources required to monitor detected anomalies through computation of the severity score for each detected anomaly. In this embodiment, the program 104 improves current data analysis by increasing optimization of the computing device 102 through determining the detected anomalies with the largest impact on the functionality of the computing device 102 based on the computed severity score associated with each detected anomaly. In this embodiment, the program 104 improves the current data analysis technology by identifying a plurality of data logs; generating a data model using analyzed time series data from the identified data logs; detecting anomalies within the generated data model; constructing a causal graph using the detected anomalies and retrieved domain knowledge; computing a severity value for the detected anomalies with the constructed causal graph; and assigning the detected anomaly to a classification based on the computed severity value associated with the detected anomaly. In this embodiment, the program 104 identifies data logs at a predetermined time window. For example, the program 104 identifies five data logs at given time window t. In this embodiment, the program 104 determines classifications for each identified data log using an existing classifier algorithm. In another embodiment, the program 104 determines classifications for each identified data log using a dictionary-based classifier algorithm. In this embodiment, the program 104 detects anomalies within the generated data model using a data log anomaly detector algorithm, which detects whether there is an anomaly or not in the give time window with respect to the function of the computing device 102. In another embodiment, the program 104 generates a multivariate time series of data logs in response to detecting a plurality of anomalies within the generated data model, wherein for each classification of data log, the program 104 counts the number of detected anomalies within each given time window. In this embodiment and in response to detecting anomalies within the generated data model, the program 104 constructs causal graphs for the functions of the computing device 102 using a causal inference algorithm. In this embodiment, the program 104 defines the causal graph as a depiction of the impact of each detected anomaly to the function of the computing device 102 via a quantified value. For example, the program 104 detects anomaly A and anomaly B and determines that A causes B, then the program 104 constructs a casual graph depicting a directed edge from anomaly A to anomaly B. In this embodiment and in response to computing the severity value of each detected anomaly, the program 104 dynamically updates the constructed casual graph to include a casual strength, which is a value directly proportionate to the calculated severity score. In another embodiment, the program 104 dynamically updates the constructed casual graph in response to identifying data logs associated with a different time window by sliding the time window of the multivariate timer series using the causal inference algorithm.

The network 106 can be a local area network ("LAN"), a wide area network ("WAN") such as the Internet, or a combination of the two; and it may include wired, wireless or fiber optic connections. Generally, the network 106 can be any combination of connections and protocols that will support communication between the computing device 102 and the server computer 108, specifically the program 104 in accordance with a desired embodiment of the invention.

The server computer 108 may include the program 104 and may communicate with the computing device 102 via the network 106. In another embodiment, the program 104 may transmit the constructed causal graph to the server computing device 108 for storage.

Figure 2:
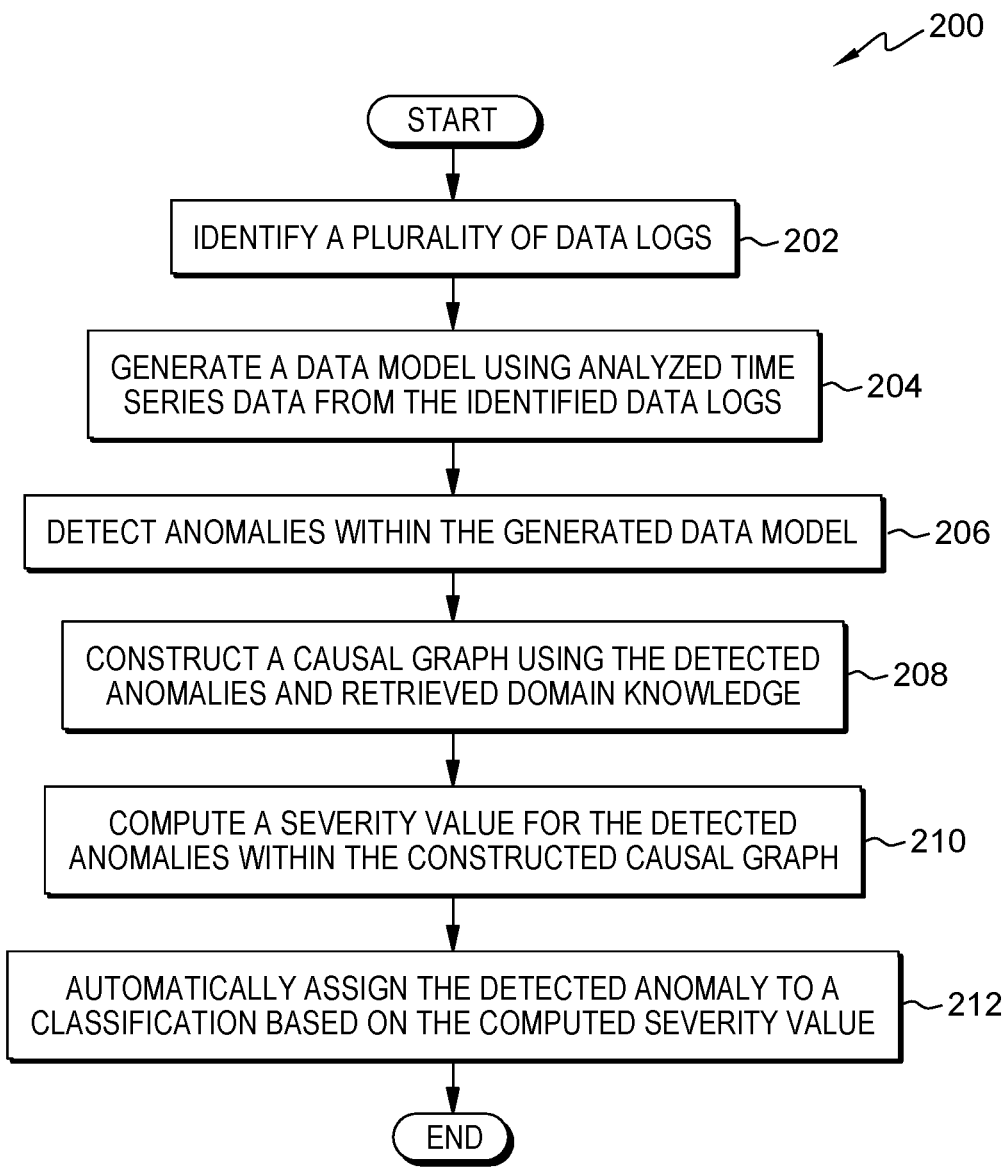
FIG. 2 is a flowchart illustrating operational steps for dynamically computing severity of anomalies and evolving grouping of computed anomalies using causal graph algorithms, in accordance with at least one embodiment of the present invention.

FIG. 2 is a flowchart 200 illustrating operational steps for dynamically computing severity of anomalies and evolving grouping of computed anomalies using causal graph algorithms, in accordance with at least one embodiment of the present invention.

In step 202, the program 104 identifies a plurality of data logs. In this embodiment, the program identifies the plurality of data logs by scanning a database for at least one data log using a plurality of sensor devices and identifying the at least one data log within the scanned database using artificial intelligence algorithms and machine learning algorithms. In this embodiment, the program 104 defines the data log as a collection of monitored data over a given period of time. For example, the program 104 identifies a data log associated to the first week of a month and a data log associated with the third week of that same month. In this embodiment, the program 104 identifies a data log within a plurality of data logs by identifying a plurality of indicative markers associated with the data log and comparing the identified plurality of indicative markers to a predetermined collection of indicative markers, wherein each indicative marker is a factor (i.e., variable) this assists in distinguishing between data points within the data log, and a collection of these indicate a specific data log from another data log. In this embodiment, the program 104 defines the indicative markers as a factor that is used to distinguish one data log from another. For example, the program 104 identifies time series data as an indicative marker to distinguish one data log from another data log. In another example, the program 104 identifies type of data, size of data, and source location of data as indicative markers associated with the data log. In this embodiment, the program 104 identifies data logs at a predetermined time window. For example, the program 104 identifies five data logs at given time window t. In another embodiment, the program 104 distinguishes the data log from a different data log using the comparison of the identified plurality of indicative markers.

In step 204, the program 104 generates a data model using analyzed time series data from the identified data logs. In this embodiment and in response to identifying data logs at a predetermined time period, the program 104 analyzes the identified data logs for time series data and generates a data model using the analyzed time series data. In this embodiment, the program 104 analyzes the identified data logs for time series data by identifying the plurality of indicative markers associated with time series data within the data logs using a data classifier algorithm. In this embodiment, the program 104 defines time series data as data associated with a specific time window. In this embodiment and in response to analyzing the identified data logs using the plurality of indicative markers, the program 104 generates a data model by retrieving domain knowledge associated with the analyzed time series data and the function of the computing device 102 impacted by the identified data log. In this embodiment, the program 104 defines domain knowledge as additional information for optimal function of the computing device 102 used for comparison of the plurality of identified indicative markers and subsequently as input within the generated data model. In this embodiment, manufacturer performance standards that are stored on online databases are examples of domain knowledge as it is additional information for the performance of the computing device

102. For example, the program 104 generates a data model for the engine output of a vehicle by compiling the analyzed data logs associated with given time window t of previous engine output and the retrieved domain knowledge for that model of car's optimal engine output.

In step 206, the program 104 detects anomalies within the generated data model. In this embodiment, the program 104 detects anomalies within the generated data model by determining whether a data point within the analyzed time series data meets or exceeds a predetermined threshold of error. In this embodiment, the program 104 determines whether the data point meets or exceeds the predetermined threshold of error by calculating a baseline of the data within the generated data model and determining that a data point that is plotted within the generated data model that is an outlier to the calculated baseline is defined as a detected anomaly. In this embodiment, the program 104 defines a detected anomaly as a data point that is a quantified distance above or below the calculated baseline of the generated data model. For example, the program 104 calculates the baseline of the generated data model associated with the engine output function as a value of 5 and detects a data point with a value of 9. In this example, the program 103 determines that detected point of 9 is a detected anomaly due to the value of the data point being more than two points above or below the calculated baseline. In this embodiment, the program 104 detects an anomaly within the generated data model at the predetermined time period using a data log anomaly detector algorithm.

In step 208, the program 104 constructs a causal graph using the detected anomalies and retrieved domain knowledge. In this embodiment, the program 104 constructs a causal graph by generating a graph with a plurality of data points, where each data point that meets or exceeds a predetermined threshold of error is a detected anomaly, and detected anomaly is connected to depict a causal cascade between the detected anomalies based on a prediction of cause of each detected anomaly. In this embodiment and in response to detecting anomalies within the generated graph, the program 104 removes data points that do not meet or exceed the predetermined threshold of error, as these data points are not anomalies. In this embodiment, the casual cascade (i.e., prediction of cause) uses the retrieved domain knowledge in addition to the analysis of the data logs for causal connection prediction. In this embodiment, the program 104 defines a causal cascade as a predicted chain of events that are caused by a singular event, which is the detected anomaly that causes the largest impact on the function of the computing device 102. In this embodiment, the program 104 constructs the causal graph by plotting each detected anomaly in a separate generated data model, where the value of the detected anomaly is directly proportional to the weight and distance of the detected anomaly from each other. In this embodiment, the program 104 determines the detected anomaly with the highest value of error and plots that detected anomaly at the center of the constructed casual graph. In this embodiment, the program 104 defines the value of error as the impact a detected anomaly may have on the function of the computing device 102, where the higher the value, the more catastrophic the failure to the function of the computing device 102 if left unresolved. In this embodiment, the program 104 calculates a weight of each detected anomaly within the constructed causal graph, where the weight is directly proportional to the plotted distance from the center detected anomaly. In this embodiment, the program 104 predicts a flow of detected anomalies, wherein the flow is the causal path of the detected anomalies. For example, the program 104 predicts that detected anomaly C was caused by detected anomaly A and detected anomaly B. In this example, the program 104 predicts that detected anomaly C causes detected anomaly D and detected anomaly E. This causal flow is used to construct the causal graph of detected anomalies.

In step 210, the program 104 computes a severity value for the detected anomalies with the constructed causal graph. In this embodiment, the program 104 computes a severity value for each detected anomaly within the constructed causal graph that is depicted as a data point. In this embodiment, the program 104 computes the severity score for each detected anomaly by determining a predetermined weight for each detected anomaly and an importance value for each detected anomaly, wherein the predetermined weight is based on the impact the detected anomaly has on other detected anomalies within the constructed causal graph and the importance value is based on the impact the detected anomaly has on the function of the computing device 102. In this embodiment, the program 104 computes the severity value for the detected anomaly by multiplying the predetermined weight of the detected anomaly to the importance value of the detected anomaly and dividing that value by the number of functions within the computing device 102 using equation 1. Equation 1 will be discussed in greater detail with respect to FIG. 3. For example, detected anomaly C has a importance value of 5, detected anomaly A and detected anomaly E each have an importance value of 2, detected anomaly B has a importance value of 1; and detected anomaly D has an importance value of 3. In this example, the weight between each two detected anomalies is the difference between the importance value of the two detected anomalies. Thus, the weight between detected anomaly A and detected anomaly C is 3; the weight between detected anomaly B and detected anomaly C is 4; the weight between detected anomaly D and detected anomaly C is 2; and the weight between detected anomaly E and detected anomaly C is 3. In this example, the severity score for detected anomaly C using equation 1 is 2, where the number of detected anomalies represents the number of functions. In this embodiment, the program 104 defines the importance value as the impact on the function of the computing device 102 in response to the detected anomaly remaining unresolved.

In step 212, the program 104 assigns the detected anomaly to a classification based on a function vector. In this embodiment, the program 104 defines the function vector as a factor that is used to classify, or group detected anomalies together. For example, the program 104 uses the computed severity value, a template count vector, and a causality vector associated with each detected anomaly as function vectors. In this embodiment, the program 104 assigns the detected anomaly to a classification based on the computed severity value by dynamically grouping the detected anomalies with a severity score within a predetermined range. In this embodiment, the program 104 groups detected anomalies that impact a plurality of functions of the computing device 102 together in response to the severity value being within a similar range. For example, the program 104 groups detected anomalies that lead to system failure of any function of the computing device 102 together. In another embodiment, the program 104 groups the detected anomalies based on classifications using count vectors of templates across a plurality of functions of the computing device 102 and causality vectors. In this embodiment, the program 104 defines the count vector as a computed average for the severity value for the detected anomalies within the group. In this embodiment, the program 104 defines the causality vector as the most recent causal relationship between detected anomalies. In this embodiment, the program 104 uses the function vectors to determine a similarity between detected anomalies assigned to the same classification or groups. In another embodiment, the program 104 uses the function vectors to determine the similarity between the detected anomaly of a first classification or group and a different detected anomaly of a second classification or group.

Figure 3:
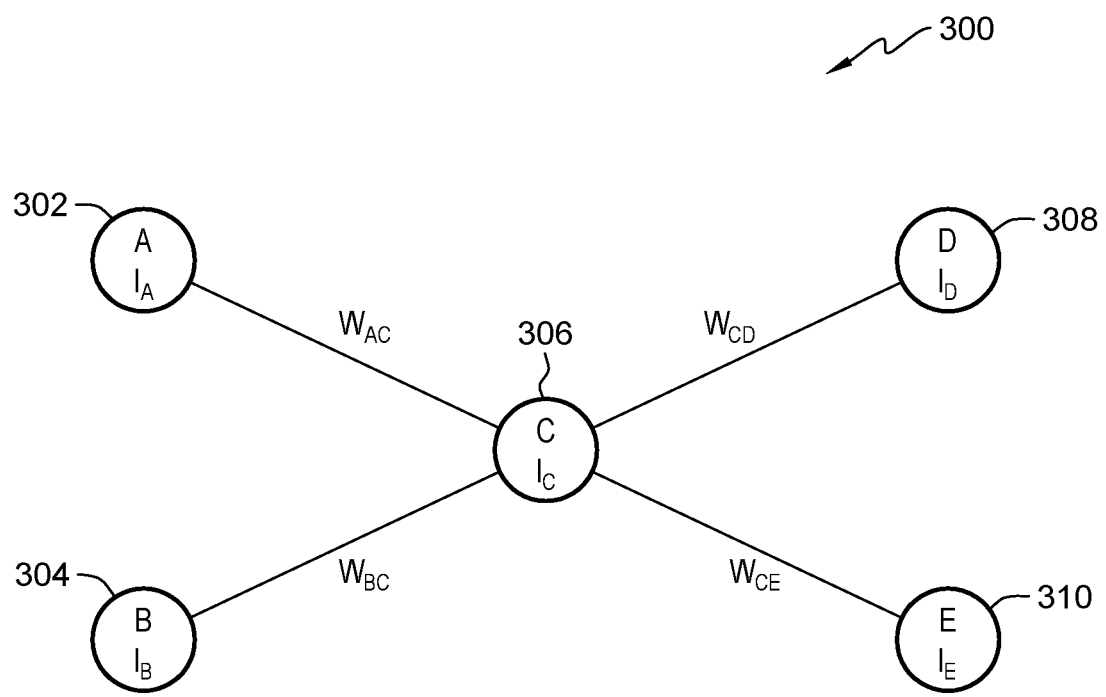
FIG. 3 is an exemplary diagram of a constructed causal graph, in accordance with at least one embodiment of the present invention.

FIG. 3 is an exemplary diagram 300 of a constructed causal graph, in accordance with at least one embodiment of the present invention.

In exemplary diagram 300, the program 104 detected five anomalies and labeled each. Detected anomaly A 302 and detected anomaly B 304 caused detected anomaly C 306. In this embodiment, detected anomaly C 306 caused detected anomaly D 308 and detected anomaly E 310. In this embodiment, the program 104 computes the severity value for the detected anomaly C 306 by utilizing the following:

$$\text{Severity of } C = ((W_{CD}*I_D + W_{CE}*I_E) - (W_{AC}*I_A + W_{BC}*I_B))*I_C/N \qquad 1)$$

With respect to equation 1, W is defined as the predetermined weight for the causal vector between at least two detected anomalies, I is defined as the importance value for each detected anomaly, and N is defined as the total number of functions associated with the computing device 102.

Figure 4:
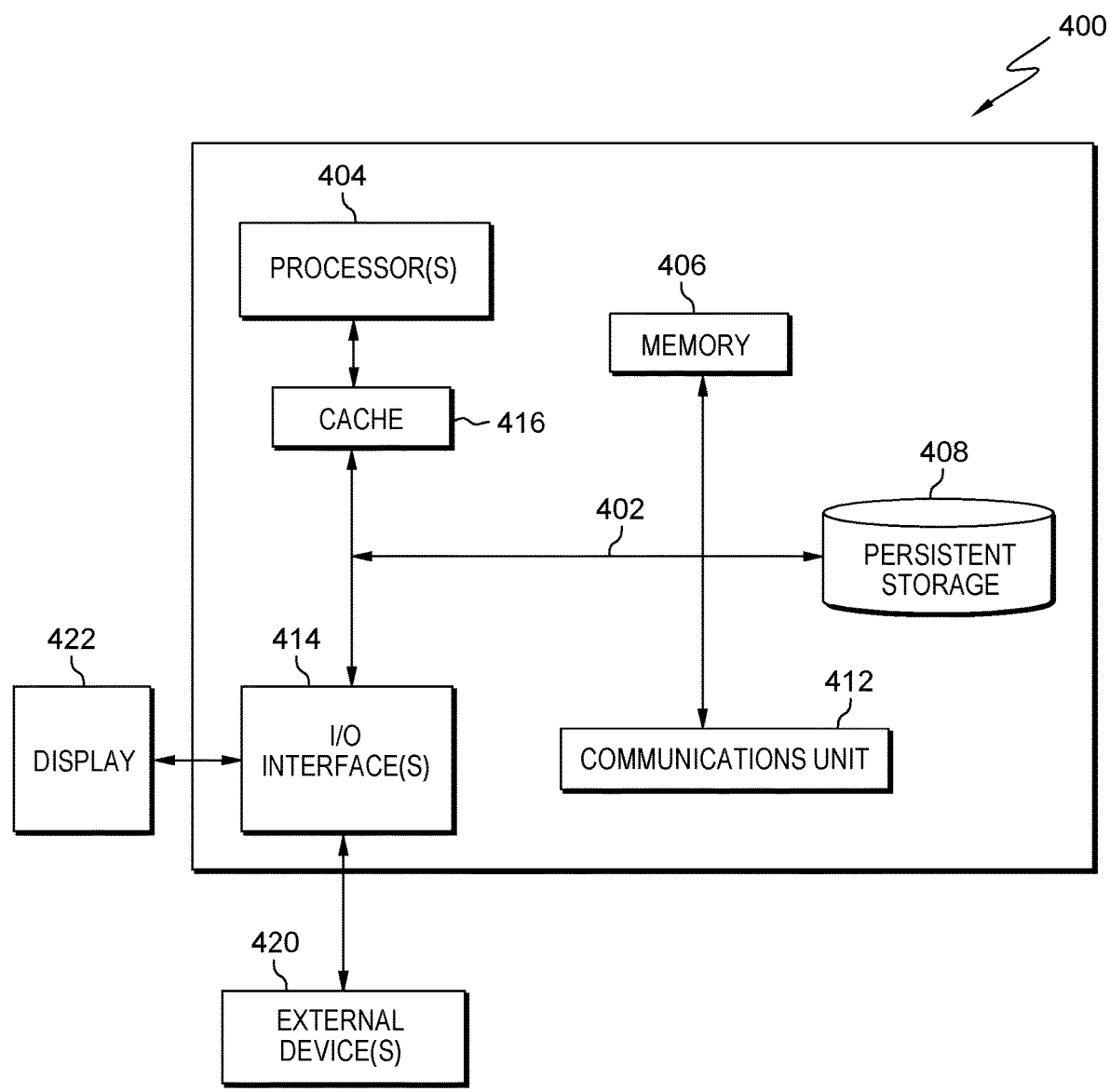
FIG. 4 depicts a block diagram of components of computing systems within a computing display environment of FIG. 1, in accordance with an embodiment of the present invention.

FIG. 4 depicts a block diagram of components of computing systems within a computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

A computer system 400 includes a communications fabric 402, which provides communications between a cache 416, a memory 406, a persistent storage 408, a communications unit 412, and an input/output (I/O) interface(s) 414. The communications fabric 402 can be implemented with any architecture designed for passing data and/or control information between processors (such as microprocessors, communications and network processors, etc.), system memory, peripheral devices, and any other hardware components within a system. For example, the communications fabric 402 can be implemented with one or more buses or a crossbar switch.

The memory 406 and the persistent storage 408 are computer readable storage media. In this embodiment, the memory 406 includes random access memory (RAM). In general, the memory 406 can include any suitable volatile or non-volatile computer readable storage media. The cache 416 is a fast memory that enhances the performance of the computer processor(s) 404 by holding recently accessed data, and data near accessed data, from the memory 406.

The program 104 may be stored in the persistent storage 408 and in the memory 406 for execution by one or more of the respective computer processors 404 via the cache 416. In an embodiment, the persistent storage 408 includes a magnetic hard disk drive. Alternatively, or in addition to a magnetic hard disk drive, the persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by the persistent storage 408 may also be removable. For example, a removable hard drive may be used for the persistent storage 408. Other examples include optical and magnetic disks, thumb drives, and smart cards that are inserted into a drive for transfer onto another computer readable storage medium that is also part of the persistent storage 408.

The communications unit 412, in these examples, provides for communications with other data processing systems or devices. In these examples, the communications unit 412 includes one or more network interface cards. The communications unit 412 may provide communications through the use of either or both physical and wireless communications links. The program 104 may be downloaded to the persistent storage 408 through the communications unit 412.

The I/O interface(s) 414 allows for input and output of data with other devices that may be connected to a mobile device, an approval device, and/or the server computer 108. For example, the I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., the program 104, can be stored on such portable computer readable storage media and can be loaded onto the persistent storage 408 via the I/O interface(s) 414. The I/O interface(s) 414 also connect to a display 422.

The display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying a plurality of data logs;
   generating a data model using time series data from the identified data logs, wherein generating the data model comprises:
   identifying a plurality of indicative markers associated with the time series data within the data logs using a data classifier algorithm; and
   analyzing the identified plurality of indicative markers for the time series data;
   retrieving domain knowledge associated with the time series data and the function of the computing device impacted by the identified data logs; and
   generating the data model based on the analysis of the identified plurality of indicative markers and the retrieved domain knowledge;
   detecting anomalies within the generated data model;
   in response to detecting anomalies within a generated data model, constructing a causal graph using the detected anomalies and retrieved domain knowledge, wherein the detected anomalies are located at a center of the constructed casual graph;

computing a severity value for the detected anomalies with the constructed causal graph;

assigning the detected anomalies to a classification based on a function vector, wherein the computed severity value is a function vector; and automatically modifying a function of a computing device based on the function vector of the assigned, detected anomalies, wherein the modification addresses the detected anomalies located at a center of the constructed casual graph.

2. The computer-implemented method of claim 1, wherein identifying the plurality of data logs comprises:

scanning a database for at least one data log using a plurality of sensor devices; and identifying the at least one data log within the scanned database using artificial intelligence algorithms and machine learning algorithms.

3. The computer-implemented method of claim 1, wherein identifying the plurality of data logs comprises:

identifying a plurality of indicative markers associated with the plurality of data logs;

comparing the identified plurality of indicative markers to a predetermined collection of indicative markers; and distinguishing the data log from a different data log using the comparison of the identified plurality of indicative markers.

4. The computer-implemented method of claim 1, wherein constructing the causal graph comprises determining whether a data point within the time series data meets or exceeds a predetermined threshold of error.

5. The computer-implemented method of claim 4, wherein determining whether the data point within the time series data meets or exceeds the predetermined threshold of error comprises:

calculating a baseline of the data within the generated data model; and determining that a data point that is plotted within the generated data model is an outlier to the calculated baseline, wherein the outlier is defined as a detected anomaly that is more than two points of value above or below the calculated baseline.

6. The computer-implemented method of claim 1, wherein constructing the causal graph comprises:

generating a graph depicting a causal cascade between the detected anomalies, where each data point represents a detected anomaly; and plotting each detected anomaly in the generated graph, where a value of the detected anomaly is directly proportional to a weight and a distance of each detected anomaly from a center detected anomaly.

7. The computer-implemented method of claim 1, wherein computing the severity score for each detected anomaly comprises:

determining a predetermined weight for each detected anomaly and an importance value for each detected anomaly, wherein the predetermined weight is based on the impact each detected anomaly has on other detected anomalies within the constructed causal graph and the importance value is based on the impact the detected anomaly has on the function of the computing device;

multiplying the predetermined weight of each detected anomaly to respective importance value of each detected anomaly; and dividing the output of the multiplication value by a number of functions within the computing device.

8. The computer-implemented method of claim 1, wherein assigning the detected anomalies to the classification based on the function vector comprises dynamically grouping the detected anomalies with a function vector score within a predetermined range.

9. A computer program product comprising:

one or more computer readable storage media and program instructions stored on the one or more computer readable storage media, the program instructions comprising:

program instructions to identify a plurality of data logs;

program instructions to generate a data model using time series data from the identified data logs;

program instructions to detect anomalies within the generated data model, wherein the program instructions to generate the data model comprise:

program instructions to identify a plurality of indicative markers associated with the time series data within the data logs using a data classifier algorithm; and program instructions to analyze the identified plurality of indicative markers for the time series data;

program instructions to retrieve domain knowledge associated with the time series data and the function of the computing device impacted by the identified data logs; and program instructions to generate the data model based on the analysis of the identified plurality of indicative markers and the retrieved domain knowledge;

in response to detecting anomalies within the generated data model, program instructions to construct a causal graph using the detected anomalies and retrieved domain knowledge, wherein the detected anomalies are located at a center of the constructed casual graph;

program instructions to compute a severity value for the detected anomalies with the causal graph;

program instructions to assign the detected anomalies to a classification based on a function vector, wherein the computed severity value is a function vector; and program instructions to automatically modify a function of a computing device based on the function vector of the assigned, detected anomalies, wherein the modification addresses the detected anomaly located at a center of the casual graph.

10. The computer program product of claim 9, wherein the program instructions to identify the plurality of data logs comprise:

program instructions to scan a database for at least one data log using a plurality of sensor devices; and program instructions to identify the at least one data log within the scanned database using artificial intelligence algorithms and machine learning algorithms.

11. The computer program product of claim 9, wherein the program instructions to identify the plurality of data logs comprise:

program instructions to identify a plurality of indicative markers associated with the plurality of data logs;

program instructions to compare the identified plurality of indicative markers to a predetermined collection of indicative markers; and program instructions to distinguish the data log from a different data log using the comparison of the identified plurality of indicative markers.

12. The computer program product of claim 9, wherein the program instructions to construct the causal graph comprise program instructions to determine whether a data point within the time series data meets or exceeds a predetermined threshold of error.

13. The computer program product of claim 12, wherein the program instructions to determine whether the data point within the time series data meets or exceeds the predetermined threshold of error comprise:
    program instructions to calculate a baseline of the data within the generated data model; and
    program instructions to determine that a data point that is plotted within the generated data model is an outlier to the calculated baseline, wherein the outlier is defined as a detected anomaly that is more than two points of value above or below the calculated baseline.

14. The computer program product of claim 9, wherein the program instructions to construct the causal graph comprise:
    program instructions to generate a graph depicting a causal cascade between the detected anomalies, where each data point represents a detected anomaly; and
    program instructions to plot each detected anomaly in the generated graph, where a value of the detected anomaly is directly proportional to a weight and a distance of each detected anomaly from a center detected anomaly.

15. A computer system comprising:
    one or more computer processors;
    one or more computer readable storage media; and
    program instructions stored on the one or more computer readable storage media for execution by at least one of the one or more processors, the program instructions comprising:
    program instructions to identify a plurality of data logs;
    program instructions to generate a data model using time series data from the identified data logs;
    program instructions to detect anomalies within the generated data model, wherein the program instructions to generate the data model comprise:
    program instructions to identify a plurality of indicative markers associated with the time series data within the data logs using a data classifier algorithm; and
    program instructions to analyze the identified plurality of indicative markers for the time series data;
    program instructions to retrieve domain knowledge associated with the time series data and the function of the computing device impacted by the identified data logs; and
    program instructions to generate the data model based on the analysis of the identified plurality of indicative markers and the retrieved domain knowledge;
    in response to detecting anomalies within the generated data model, program instructions to construct a causal graph using the detected anomalies and retrieved domain knowledge, wherein the detected anomalies are located at a center of the constructed casual graph;
    program instructions to compute a severity value for the detected anomalies with the causal graph;
    program instructions to assign the detected anomalies to a classification based on a function vector, wherein the computed severity value is a function vector; and
    program instructions to automatically modify a function of a computing device based on the function vector of the assigned, detected anomalies, wherein the modification addresses the detected anomaly located at a center of the casual graph.

16. The computer system of claim 15, wherein the program instructions to identify the plurality of data logs comprise:
    program instructions to scan a database for at least one data log using a plurality of sensor devices; and
    program instructions to identify the at least one data log within the scanned database using artificial intelligence algorithms and machine learning algorithms.

17. The computer system of claim 15, wherein the program instructions to identify the plurality of data logs comprise:
    program instructions to identify a plurality of indicative markers associated with the plurality of data logs;
    program instructions to compare the identified plurality of indicative markers to a predetermined collection of indicative markers; and
    program instructions to distinguish the data log from a different data log using the comparison of the identified plurality of indicative markers.

* * * * *